US012570175B2

(12) United States Patent
Mallikarachchi

(10) Patent No.: US 12,570,175 B2
(45) Date of Patent: Mar. 10, 2026

(54) ALTERNATIVE RECHARGE AND DISTRIBUTION SYSTEM FOR ELECTRIC VEHICLES

(71) Applicant: Jayantha S. Mallikarachchi, Tampa, FL (US)

(72) Inventor: Jayantha S. Mallikarachchi, Tampa, FL (US)

( * ) Notice: Subject to any disclaimer, the term of this patent is extended or adjusted under 35 U.S.C. 154(b) by 31 days.

(21) Appl. No.: 18/750,422

(22) Filed: Jun. 21, 2024

(65) Prior Publication Data

US 2025/0388110 A1     Dec. 25, 2025

(51) Int. Cl.
*B60L 53/62* (2019.01)
*B60L 53/51* (2019.01)
*H02J 3/38* (2006.01)
*H02J 7/00* (2006.01)

(52) U.S. Cl.
CPC .............. *B60L 53/62* (2019.02); *B60L 53/51* (2019.02); *H02J 3/38* (2013.01); *H02J 7/0013* (2013.01); *H02J 7/0063* (2013.01); *H02J 7/00712* (2020.01); *H02J 2300/22* (2020.01); *H02J 2300/28* (2020.01)

(58) Field of Classification Search
CPC ...... B60L 53/62; B60L 53/51; H02J 7/00712; H02J 3/38; H02J 7/0013; H02J 7/0063; H02J 2300/28; H02J 2300/22
See application file for complete search history.

(56) References Cited

U.S. PATENT DOCUMENTS

| | | | |
|---|---|---|---|
| 750,102 A | 1/1904 | Edison | |
| 7,667,416 B2 * | 2/2010 | Queveau | ................. B60L 58/21 |
| | | | 318/87 |
| 8,169,182 B1 * | 5/2012 | Kimble | ................... B60L 8/006 |
| | | | 290/44 |
| 8,517,132 B2 | 8/2013 | Heichal et al. | |
| 8,598,838 B2 * | 12/2013 | Cunico | ................... B60L 8/006 |
| | | | 320/101 |
| 10,833,379 B2 | 11/2020 | Scaringe et al. | |
| 11,053,920 B2 * | 7/2021 | Pisharodi | ................ H02S 20/30 |
| 11,448,190 B2 * | 9/2022 | Chak | ......................... F03D 9/22 |
| 11,975,620 B2 | 5/2024 | Tombelli et al. | |
| 11,975,629 B2 | 5/2024 | Hellgren | |
| 11,978,869 B2 | 5/2024 | Chartier et al. | |
| 11,978,883 B2 | 5/2024 | Lee et al. | |

(Continued)

*Primary Examiner* — Carlos Amaya
(74) *Attorney, Agent, or Firm* — Bold IP, PLLC; Christopher Mayle

(57) ABSTRACT

A system and method for an alternative power system that uses a dynamo with a centrifugal fan and solar panel connected in parallel to recharge multiple batteries simultaneously. As the vehicle operates on the Alternative Power System, the power discharging controller utilizes battery A. In parallel, the dynamo with a centrifugal fan and a solar panel recharge battery B and battery C. A charging controller manages this recharging functionality. When battery A, which supplies power to motor, is reduced to a certain level, a power discharging controller automatically switches to battery B, and the charging controller connects automatically to battery A and recharges battery C and battery A. When battery B is reduced to a certain level, the power discharging controller switches to battery C. Then, charging controller connects automatically to battery B and recharges battery A and battery B.

6 Claims, 2 Drawing Sheets

(56)                    References Cited

U.S. PATENT DOCUMENTS

| | | | |
|---|---|---|---|
| 11,978,907 B2 | 5/2024 | Nomura et al. | |
| 11,979,112 B2 | 5/2024 | Khalid et al. | |
| 11,980,102 B2 | 5/2024 | Boyd et al. | |
| 2006/0213697 A1* | 9/2006 | Sutherland | F03D 9/32 |
| | | | 180/2.2 |
| 2010/0006351 A1* | 1/2010 | Howard | B60L 50/60 |
| | | | 180/2.2 |
| 2024/0144398 A1 | 5/2024 | Paik et al. | |

* cited by examiner

| When fully charge | | | Recharge cycle 1 | | Recharge cycle 2 | | Recharge cycle 3 | | Total Miles |
|---|---|---|---|---|---|---|---|---|---|
| | kWh | Miles | kWh | Miles | kWh | Miles | kWh | Miles | |
| Battery1 | 30 | 80 | 15 | 40 | 7 | 20 | 3.5 | 10 | |
| Battery2 | 30 | 80 | 15 | 40 | 7 | 20 | 3.5 | 10 | |
| Battery3 | 30 | 80 | 15 | 40 | 7 | 20 | 3.5 | 10 | |
| Total | | 240 | | 120 | | 60 | | 30 | 450 |

FIG. 2

ALTERNATIVE RECHARGE AND DISTRIBUTION SYSTEM FOR ELECTRIC VEHICLES

Field of Disclosure

The overall field of this invention is for electric vehicles to recharge multiple batteries instead of a single battery while the vehicle is moving, allowing the vehicle to run more miles without stopping for recharge.

BACKGROUND

Present electric vehicles run on battery power and must recharge when the remaining power is low to a specific limit. Then, the car needs to stop and recharge. During operation, a vehicle is subjected to a continuous barrage of high-power wind, especially during the daytime when it is bathed in abundant sunlight. Our proposed Alternative Power System can harness these environmental factors to recharge batteries.

SUMMARY

The present invention is directed to an Alternative Power System that uses a dynamo with a centrifugal fan and solar panel connected in parallel to recharge multiple batteries simultaneously. At the beginning or when not running, all those batteries may charge 100% using AC power, as they currently do. The following patents are incorporated by Reference: U.S. Pat. Nos. 750,102, 8,517,132, and 10,833, 379.

As the vehicle operates on the Alternative Power System, the power discharging controller utilizes battery A. In parallel, the dynamo with a centrifugal fan and a solar panel recharge battery B and battery C. A charging controller manages this recharging functionality.

When battery A, which supplies power to the motor, is reduced to a certain level, a power discharging controller automatically switches to battery B, and the charging controller connects automatically to battery A and recharges battery C and battery A.

When battery B is reduced to a certain level, the power discharging controller switches to battery C. Then, charging controller connects automatically to battery B and recharges battery A and battery B. This is a continuous cycle that may be implemented.

With wind and solar power, batteries may not recharge 100%, but they are estimated to charge at least 50% which is adequate when switching between multiple batteries. Also, when the vehicle is not running and stays under direct sunlight, the solar panel keeps charging the batteries. This helps the vehicle run a longer distance than a single battery.

DESCRIPTION OF DRAWINGS

The present invention will be described by way of exemplary embodiments, but not limitations, illustrated in the accompanying drawings in which like references denote similar elements, and in which:

FIG. 2 is directed to a spreadsheet for the results of the alternative power source when connected to the vehicle.

DETAILED DESCRIPTION

Figure 1:
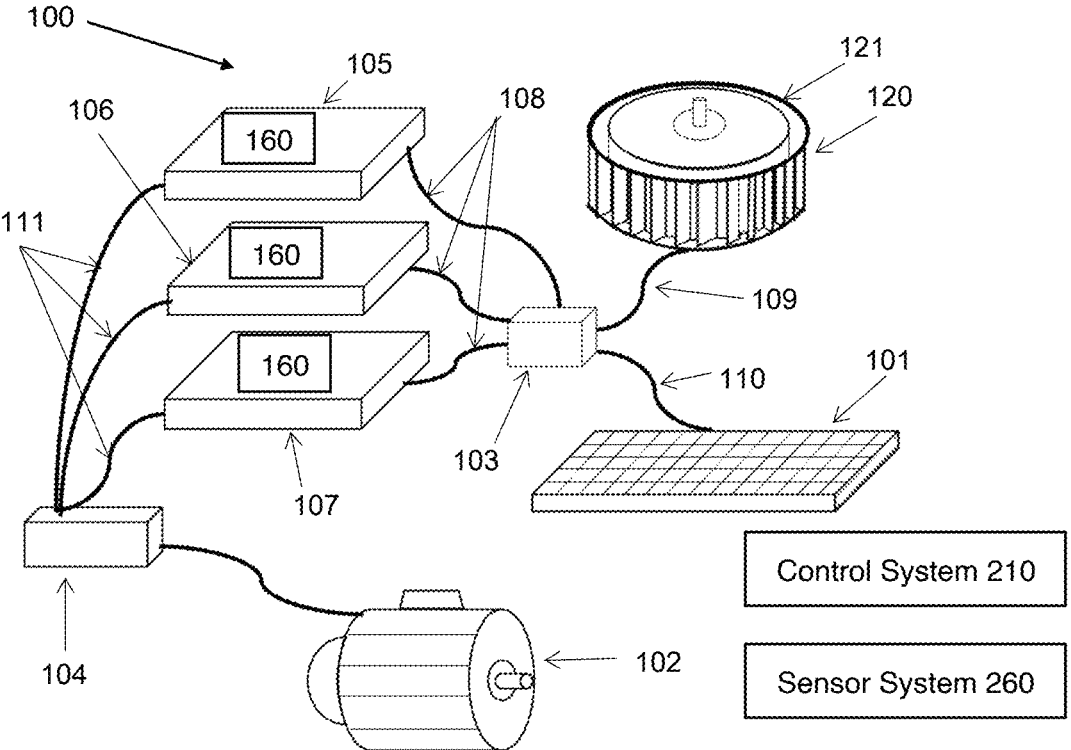
FIG. 1 is directed to an illustration of the alternative power source.

The following description and drawings are illustrative and are not to be construed as limiting. Numerous specific details are described to provide a thorough understanding of the disclosure. However, in certain instances, well-known or conventional details are not described in order to avoid obscuring the description. References to one or another embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skills in the art to which this disclosure pertains.

In this document, "Alternative recharge and distribution system for electric vehicles" may also be referred to as "Alternative Power System" or any other similar variation. The present disclosure is generally drawn to an alternative power system and method that uses a dynamo with a centrifugal fan and solar panel to recharge multiple batteries for an electric vehicle. The alternative power system for electrical vehicles, includes a first battery, a second battery, and a third battery, a dynamo with a centrifugal fan, a solar panel, the solar panel connected in parallel with the dynamo, a charging controller that automatically selects a non-used battery by a motor of the first battery, the second battery, and the third battery, and a power discharging controller that automatically selects a deficiently charged battery motor of the first battery, the second battery, and the third battery when a currently charged battery of the first battery, the second battery, and the third battery has reached a preset minimum level of power.

At the beginning or when not running, those batteries may charge 100% using AC power. Utilizing this invention, a single car battery with 90 kWh may go 240 miles and 3 batteries with 30 kWh each may run the same 240 miles. While running the car, each recharging cycle may recharge 50% of each battery. Then, at least a total of 450 miles can be achieved. This is illustrated in FIG. 2.

With reference now to FIG. 1, an exemplary embodiment of an alternative power system 100 is shown. Alternative power system 100 may utilize a control system 210 to control the actuation of the other systems. Control system 210 may have a series of computing devices. Control system 210 may be in the form of a circuit board, a memory, or other non-transient storage medium in which computer-readable coded instructions are stored and one or more processors configured to execute the instructions stored in the memory. Control system 210 may have a wireless transmitter, a wireless receiver, and a related computer process executing on the processors.

Computing devices of control system 210, may be any type of computing device that typically operates under the control of one or more operating systems, which control scheduling of tasks and access to system resources. Computing devices may be a phone, tablet, television, desktop computer, laptop computer, networked router, networked switch, networked bridge, or any computing device capable of executing instructions with sufficient processor power and memory capacity to perform operations of control system 210.

The one or more computing devices may be integrated into control system 210, while in other non-limiting embodiments, control system 210 may be a remotely located computing device or server configured to communicate with one or more other control systems. Control system 210 may also include an internet connection, network connection, and/or other wired or wireless means of communication (e.g., LAN, etc.) to interact with other components.

The connection allows for updating, controlling, sending/retrieving information, monitoring, or otherwise interacting passively or actively with control system 210.

Control system 210 may include control circuitry and one or more microprocessors or controllers acting as a servo control mechanism capable of receiving input from one or more sensors, analyzing the input from the one or more sensors, and generating an output signal to the various systems. The microprocessors (not shown) may have on-board memory to control the power that is applied to the various systems.

Control system 210 may include circuitry to provide an actuable interface for a user to interact with, including switches and indicators and accompanying circuitry for an electronic control panel or mechanical control panel. Such an actuable interface may present options to select from. Control system 210 may be preprogrammed with any reference values, by any combination of hardwiring, software, or firmware to implement various operational modes including but not limited to temperature, light, and humidity values.

In one or more embodiments, control system 210 may include a solid-state control system. The solid-state control system includes a charging controller 103 that manages recharging functionality and a power discharging controller 104 executing software instructions that switch between batteries.

Alternative power system 100 may include a sensor system 260, which may include a plurality of detectors mounted or otherwise connected to the vehicle and various components of the vehicle. In one non-limiting embodiment, sensor system 260 may have infrared ("IR") detectors having photodiodes and related amplification and detection circuitry. In other embodiments, radio frequencies, magnetic fields, and ultrasonic sensors, temperature sensors, pressure sensors, humidity sensors, or other types of sensors and transducers may be employed. Detectors may be arranged in any number of configurations and arrangements.

In some embodiments, sensor system 260 may have a light sensor which produces an input signal indicative of the intensity of the ambient light where the vehicle is located. This provides information if the solar panels should be activated to charge batteries. Control system 210 may receive this signal from sensor system 260, whereby the microprocessors then compare the received input value from sensor system 260 using a comparison function and are able to evaluate the input data against a setting or expectation of a certain reference value stored within the memory of control system 210. Control system 210 determines that there is sunlight and solar panels may be utilized to charge batteries.

Sensor system 260 may have a temperature sensor in any suitable position in order to measure, either directly or indirectly, a temperature associated with or in the general proximity of any of the components For example, the temperature sensor can include one or more (or any suitable combination) of the following components or devices: a resistive element, a strain gauge, a temperature probe, a thermistor, a resistance temperature detector (RTD), a thermocouple, a thermometer (liquid-in-glass, filled-system, bimetallic, infrared, spot radiation), a semiconductor, an optical pyrometer (radiation thermometer), a fiber optic device, a phase change device, a thermowell, or a thermal imager.

FIG. 1 illustrates the connectivity of batteries to the generator and solar panel through the charging controller and batteries to the motor through power discharging controller 104. Alternative power system 100 may include a dynamo 120 with a centrifugal fan 121, one or more solar panels 101, an electric motor 102, a charging controller 103, a power discharging controller 104, a rechargeable battery A 105, a rechargeable battery B 106, a rechargeable battery C 107, and wire connections 108, 109, 110, 111 to connect the various components. In this Alternative power system 100, one or more dynamos 120 with centrifugal fans 121 may be placed under the hood of the vehicle, and one or more solar panels 101 may be placed on the hood or the roof of the car.

Electric motor 102 may be an alternating current (AC) induction motor, permanent magnet synchronous motor (PMSM), a switched reluctance motor, or any suitable motor for an electric or hybrid vehicle. Centrifugal fan 121 may include a rotating impeller enclosed within a casing. Centrifugal fan 121 may drive by a mechanical source, such as a motor. As the impeller rotates, it pulls air in centrally and expels it radially, converting the mechanical energy of the motor into kinetic energy of the air.

Dynamo 120 may charge batteries by converting mechanical energy into electrical energy, which is then used to recharge the batteries. During operation, rotational motion of centrifugal fan's 121 impeller may transfer to dynamo 120. This may be achieved through a direct mechanical linkage, such as a belt or a gear strain system, that connects the fan's rotating shaft to the dynamo 120.

Solar panels 101 charge the batteries 105, 106, 107 through a process that converts sunlight into electrical energy. Solar panels 101 may be made up of photovoltaic (PV) cells to absorb sunlight. Each PV cell is made from semiconductor materials, typically silicon, which can convert light into electricity. When sunlight hits the PV cells, it excites electrons in the semiconductor material, creating a flow of electrical current. The movement of electrons generates direct current (DC) electricity as they flow through the circuit created within the solar panel.

Dynamo 120 and solar panel 101 may be connected in parallel to charge the batteries. In a parallel configuration, both dynamo 120 and the solar panel 101 may have their positive terminals connected to one another and similarly their negative terminals connected. This allows the voltage level from each source to remain the same across the circuit, while the available current is the sum of the currents produced by each source.

Control system 210 may utilize one or more voltage regulators or maximum power point tracking ensuring each source operates at its optimal voltage and preventing one source from back-feeding into the other, which could cause damage to the system. Control system 210 may have one or more diodes that may be used to allow current to flow in one direction only, from each generation source towards the batteries or load, but not back into the generation sources. The combined output from dynamo 120 and the solar panel 101 is then directed towards charging controller 103, which manages the flow of electricity into the battery. Charging controller 103 ensures that the batteries are charged at the correct voltage and current, protecting it from overcharging and enhancing battery life and performance. This may be done automatically or may be done manually by a user on a user interface such as a dashboard on the vehicle. Control system 210 may also determine when the vehicle is running, moving, or stationary to determine when alternative power system 100 should be used.

Batteries 105, 106, 107 may have one or more sensor 160 that monitors the charge of a battery whereby the sensor 160 measures the voltage across the battery terminals. Sensor 160 monitors the current entering or leaving batteries 105, 106, 107 to determine the rate of charge or discharge. Sensor 160 may include a temperature probe to monitor batteries 105, 106, 107 temperature, helping to prevent overheating and enabling temperature-compensated charging and discharging.

Sensors 160 may estimate how much charge has been used or replenished, providing a more accurate state of current. Sensors 160 may track batteries 105, 106, 107 performance over time to assess its overall health, which may degrade due to factors like cycle number, age, temperature, and overcharging. Sensors 160 may also measure the internal impedance of the battery, which increases as the battery ages. Sensors 160 may communicate with other system components such as control system 210 via wired or wireless connections, using protocols such as I2C, SMBus, or CAN bus. This connectivity allows for real-time data monitoring and adjustments based on battery status which may determine the actions of charging controller 103 and power discharging controller 104, such as when to charge which battery as well as when to switch to charging a different battery.

During use, charging controller 103 directs the regulated and combined electricity from dynamo 120 and solar panel 101 into the battery, ensuring efficient and safe charging. As the vehicle operates on the Alternative power system 100, the power discharging controller 104 utilizes battery A 105.

In parallel, dynamo 120 with a centrifugal fan 121 and solar panel 101 recharges battery B 106 and battery C 107. The charging controller 103 manages this recharging functionality and stops the flow of electricity when the charge is sufficient. When battery A 105, which supplies power to motor 102, is reduced to a certain level, the power discharging controller 104 automatically switches to battery B 106, and charging controller 103 connects automatically to battery A 105 and recharges battery C 107 and battery A 105. The system may switch from battery A, battery B, and battery C in alphabetic order. However, this is non limiting and may switch to the most depleted, or reverse alphabetical order, or which battery is manually selected or least charged.

When the vehicle is stationary, control system 210 may receive a signal to charge batteries by the use of just solar panel 101 whereby power discharging controller 104 switches to another battery when the charged battery has reached a predetermined threshold.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated.

What is claimed is:

1. An alternative power system for an electric vehicle comprising:
   a first battery, a second battery, and a third battery;
   a dual power generation system comprising: a dynamo mechanically coupled to a centrifugal fan positioned under a hood of the electric vehicle;
   and at least one solar panel positioned on an exterior surface of the electric vehicle;
   wherein the dynamo and the at least one solar panel are electrically connected in parallel;
   a charging controller configured to: monitor charge levels of each battery through respective sensors; simultaneously charge two batteries using combined power from both the dynamo and the at least one solar panel while the third battery powers a motor; and automatically select which two batteries to charge based on monitored charge levels; and
   a power discharging controller configured to: automatically switch power supply to the motor from a currently used battery to a fully charged battery when the currently used battery reaches a preset minimum charge level; and coordinate with the charging controller to ensure a depleted battery begins charging immediately upon being disconnected from the motor.

2. The alternative power system of claim 1, further comprising a control system including one or more processors configured to:
   receive sensor data indicating vehicle motion status;
   activate a dynamo power generation when the electric vehicle is in motion; and
   receive ambient light sensor data; and activate solar panel power generation based on detected ambient light levels while the electric vehicle is either in motion or stationary.

3. The alternative power system of claim 2, wherein each battery has a capacity of approximately 1/3 kWh of a total kWh, the charging controller is configured to charge the batteries to at least 50% capacity using the combined dynamo and solar panel power while the electric vehicle is in motion.

4. The alternative power system of claim 3, wherein each battery comprises: one or more sensors configured to: measure voltage across battery terminals; monitor current flow for determining charge and discharge rates; measure battery temperature; and estimate remaining battery charge; and a communication interface configured to transmit sensor data to the control system; wherein the charging controller adjusts charging parameters in real-time based on the sensor data from each battery.

5. The alternative power system of claim 4, wherein the dual power generation system further comprises: one or more voltage regulators configured to ensure each power source operates at its optimal voltage; one or more diodes configured to prevent back-feeding between power sources; a mechanical linkage system connecting the centrifugal fan to the dynamo; wherein the charging controller manages a combined output from both power sources to provide optimal charging current to selected batteries.

6. The alternative power system of claim 5, further comprising a user interface mounted on a vehicle dashboard configured to: display real-time status of each battery's charge level; show current power generation rates from both dynamo and solar sources; indicate which batteries are currently charging and which is powering the motor; provide manual override controls for battery selection; and alert the user when automatic switching between batteries occurs; wherein the alternative power system maintains automatic operation unless manually overridden through the user interface.

\* \* \* \* \*